United States Patent
Booth et al.

(10) Patent No.: US 11,618,546 B2
(45) Date of Patent: Apr. 4, 2023

(54) PROCESS OF JOINING A WING TO AN AIRCRAFT FUSELAGE

(71) Applicants: Airbus SAS, Blagnac (FR); Airbus Operations GmbH, Hamburg (DE)

(72) Inventors: Andrew Booth, Blagnac (FR); Eckart Frankenberger, Hamburg (DE)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 228 days.

(21) Appl. No.: 16/869,074

(22) Filed: May 7, 2020

(65) Prior Publication Data
US 2020/0354038 A1 Nov. 12, 2020

(30) Foreign Application Priority Data
May 10, 2019 (EP) .................................... 19305603

(51) Int. Cl.
*G05B 19/402* (2006.01)
*B64C 1/26* (2006.01)
*B64F 5/10* (2017.01)

(52) U.S. Cl.
CPC .................. *B64C 1/26* (2013.01); *B64F 5/10* (2017.01); *G05B 19/402* (2013.01)

(58) Field of Classification Search
CPC .................................................. G05B 19/402
See application file for complete search history.

(56) References Cited

U.S. PATENT DOCUMENTS

| 10,275,565 | B2 | 4/2019 | Vasquez et al. |
| 2010/0264573 | A1 | 10/2010 | Kott |
| 2014/0236334 | A1 | 8/2014 | Glasscock et al. |
| 2017/0132355 | A1 | 5/2017 | Vasquez et al. |
| 2017/0210489 | A1* | 7/2017 | Bode ................ G05B 19/41805 |
| 2019/0205501 | A1* | 7/2019 | Vasquez .................... B64C 1/26 |

FOREIGN PATENT DOCUMENTS

| EP | 3168162 A1 | 5/2017 |
| WO | 2009068106 A1 | 6/2009 |

OTHER PUBLICATIONS

European Search Report; priority document.

* cited by examiner

*Primary Examiner* — Joshua J Michener
*Assistant Examiner* — Michael B. Kreiner
(74) *Attorney, Agent, or Firm* — Greer, Burns & Crain, Ltd.

(57) ABSTRACT

A process of joining a wing to an aircraft fuselage comprising the steps of: mapping the wing root of the wing, mapping the center-wing-box (CWB) of the aircraft fuselage, determining the position to provide the hole pattern on the CWB, providing the holes on the CWB, and attaching the wing root to the CWB. Primary and secondary templates with corresponding hole patterns may be used in combination with targets and laser trackers to implement the process. The hole pattern of the wing root can therefore be duplicated on the CWB at a position such that when the wings are joined to the fuselage, the aircraft will have optimum flight performance and dynamic symmetry. A predictive fit is thus provided, based on virtual representation and analysis, and advantageously permits the hole pattern to be provided without requiring the CWB and wing root to be brought together.

9 Claims, 4 Drawing Sheets

PROCESS OF JOINING A WING TO AN AIRCRAFT FUSELAGE

CROSS-REFERENCES TO RELATED APPLICATIONS

This application claims the benefit of the European patent application No. 19305603.3 filed on May 10, 2019, the entire disclosures of which are incorporated herein by way of reference.

FIELD OF THE INVENTION

The invention relates to the field of aircraft assembly. In particular, the invention relates to a process of joining a wing to an aircraft fuselage which aims to speed up aircraft assembly. The invention also relates to a system of joining a wing to an aircraft fuselage.

BACKGROUND OF THE INVENTION

In present day large-aircraft assembly, the wings of an aircraft are joined to its fuselage in the Final Assembly Line (FAL). The process involves bringing up the wing to the fuselage, positioning the wing root of the wing box in alignment with the Center Wing Box (CWB) of the fuselage and with their respective holes patterns coinciding, and then bolting the two together. This forms the wing-to-fuselage joint, which is a complex and integral part of the aircraft.

Prior to attachment however, the hole pattern on the wing root has to be duplicated on the CWB, which initially comes as a blank for reasons of tolerance. In order to do this, the wing root is positioned with respect to the CWB as intended for attachment. Pilot holes are then provided at the respective locations on the CWB, by drilling from inside the wing root through the holes of the hole pattern. The wings are then moved away from the CWB for deburring, cleaning and application of sealant, and brought up once again to the CWB, with the final holes being drilled on the CWB and the wings then joined to the fuselage.

Unfortunately, duplicating the hole pattern onto the CWB is a time-consuming process which holds up several downstream operations of the assembly. In the FAL, such delays have a direct impact on production. Apart from that, the operation requires a technician to enter the narrow wing box so as to provide the pilot holes.

As such, there is clearly a need for a more efficient and practical process for joining a wing of an aircraft to its fuselage.

SUMMARY OF THE INVENTION

The present invention relates to a process of joining a wing to an aircraft fuselage, the process comprising the steps of: mapping the wing root of the wing, mapping the center-wing-box (CWB) of the aircraft fuselage, determining the position to provide the hole pattern on the CWB, providing the hole pattern on the CWB, and attaching the wing root to the CWB.

The present invention also relates to a system of joining a wing to an aircraft fuselage section, the system comprising a processor configured to: map the wing root of the wing, map the CWB of the aircraft fuselage, and determine the position to provide the hole pattern on the CWB.

BRIEF DESCRIPTION OF THE DRAWINGS

The invention will be better understood when reading the following detailed description and non-limiting examples, as well as studying the figures, wherein.

In all of these figures, identical references can designate identical or similar elements. In addition, the various portions shown in the figures are not necessarily shown according to a uniform scale, in order to make the figures more legible.

DETAILED DESCRIPTION OF THE PREFERRED EMBODIMENTS

Figure 1:
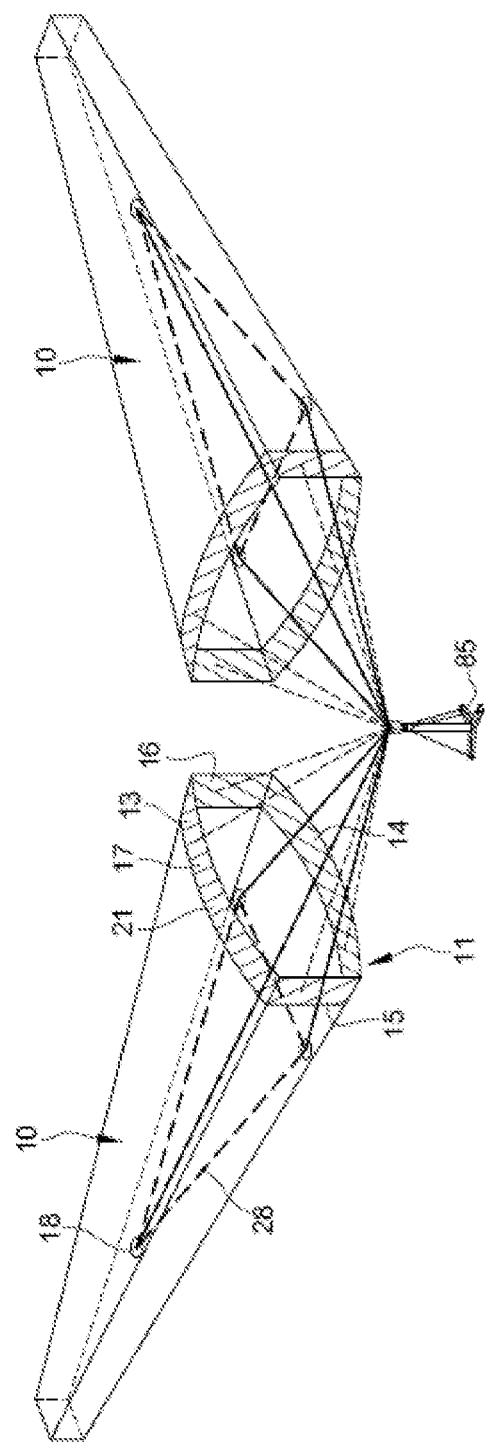
FIG. 1 shows a schematic view of the wing roots of a pair of aircraft wings being mapped.
Figure 3:
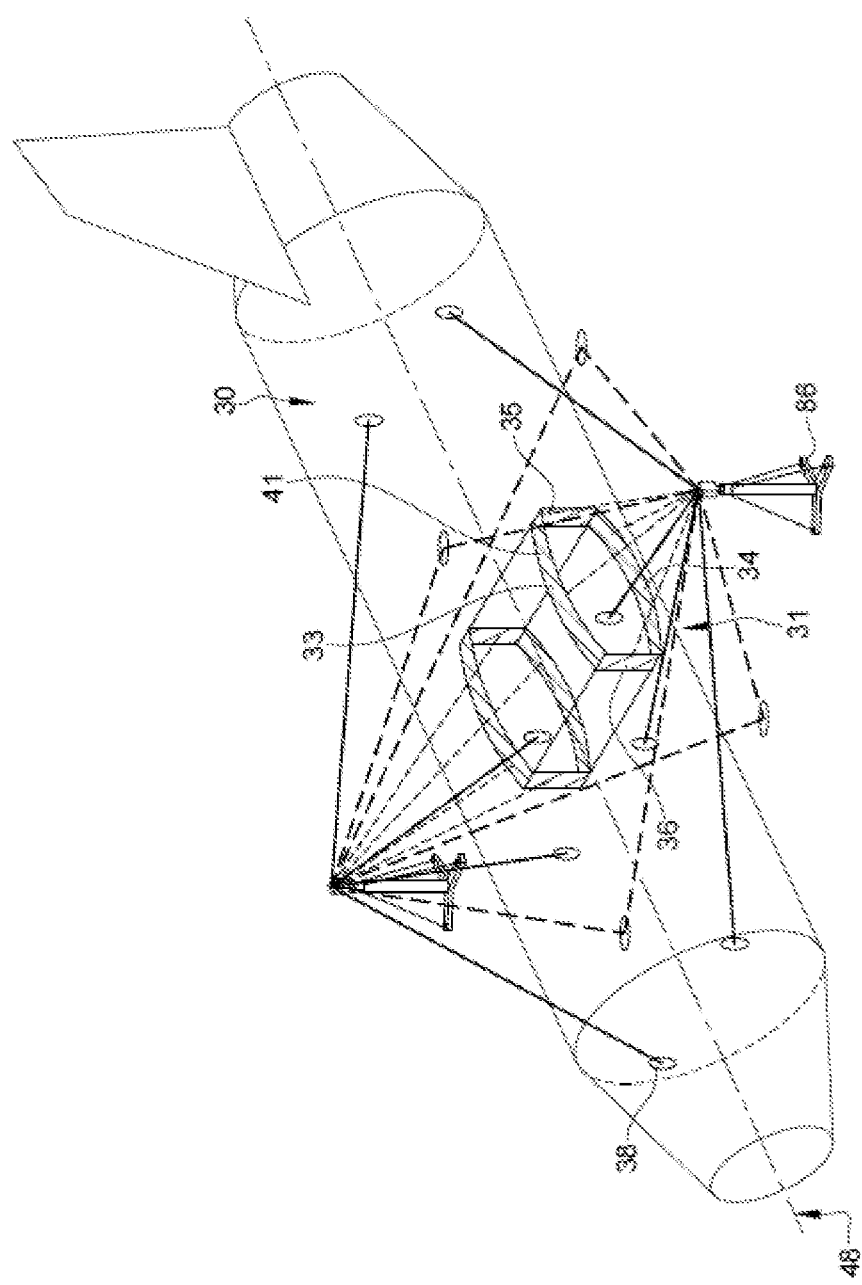
FIG. 3 shows a schematic view of the CWB of the aircraft fuselage being mapped.

FIGS. 1 and 3 show a pair of aircraft wings 10 and an aircraft fuselage 30 in the Final Assembly Line (FAL) being scanned by laser trackers 85, 86. Each wing 10 has a wing root 11, by which it will be attached to the center-wing-box (CWB) 31 of the fuselage 30. The CWB 31, which, as briefly mentioned earlier, comes as a blank, and must be provided with holes which correspond to those on the wing root 11 so that the wing 10 can be joined to the fuselage 30. In order to duplicate the hole pattern 17 of the wing root 11 onto the CWB 31, the wing root 11, as well as the CWB 31, must first be mapped.

The section(s) on of the wing root 11 where the hole pattern(s) are provided, and from which they are to be duplicated, are the upper cover 13, the lower cover 14, the rear spar 15, and the front spar 16, represented by the shaded region of the wings. These holes are typically inboard of the inboard-most rib of the wing 10. Meanwhile, corresponding section(s) on the CWB 31 where the hole pattern(s) are to be provided are the cruciform 33, which is effectively the upper cover of the CWB 31, the triform 34, which is effectively the lower cover of the CWB 31, the rear spar 35, and the front spar 36, represented by the shaded region of the CWB 31. These are typically outboard of the outboard-most rib of the CWB 31.

In general, the wing root 11 essentially fits on/inside the CWB 31 for attachment, and they will therefore have complementary surfaces where they engage each other. In the present embodiment, for example, the external surface of the upper cover 13 of the wing root 11 will engage the internal surface of the cruciform 33 of the CWB 31. Depending on the way an aircraft is designed, the wing root and the CWB may have a different arrangement of complementary surfaces. In the following, it will be appreciated that these complementary surfaces will be the relevant surfaces for mapping.

Figure 2:
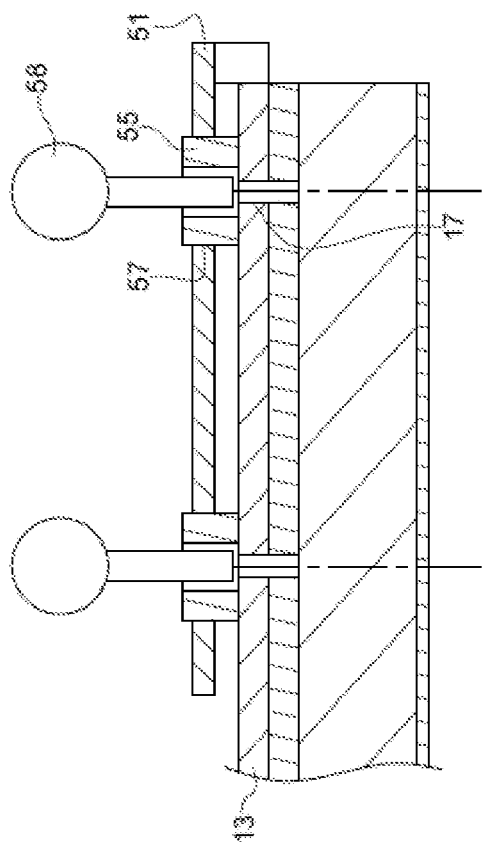
FIG. 2 shows a cross-section view of a wing root of FIG. 1 with a primary template.

FIG. 2 shows in further detail how the mapping of the wing root 11 can be performed. The figure shows a cross-section view of the upper cover 13. The upper cover 13 comprises a hole pattern 17 (two holes of which are shown). A primary template 51 is provided on the upper cover 13. It comprises a hole pattern 57 which is identical to the hole pattern 17 on the upper cover 13 of the wing root 11. The primary template 51 is mounted such that its hole pattern 57 is accurately superposed over the hole pattern 17 on the wing root 11. Similar primary templates 51 are also provided on the lower cover 14, the rear spar 15, and the front spar 16, with hole patterns 57 corresponding to those on these sections. Generally, different sections of the wing root 11 will each have a different hole pattern 17.

The templates 51 are preferably made of CFRP or aluminum sheets, which afford some amount of flexibility to conform to the local shape of the aircraft. They comprise bushes 55 at the respective holes of the hole pattern 57. This not only allows for a hard contact with the wing surface 13 which is advantageous for accurate surface representation, but it also permits inspection to verify correct alignment of the primary template 51.

Once the primary templates 51 have been mounted, laser targets 58 for scanning are installed on the primary template 51 at the bushes 55. Such targets 58 may be installed on all the bushes 55, or just those on holes at key points such as the A-B points, i.e., the inboard-outboard points. With the relevant surfaces 13-16 covered with the primary template 51, and the targets 58 installed, the laser tracker 85 begins scanning and registering the targets 58. FIG. 1 shows the laser tracker 85 scanning each of the relevant surfaces 13-16 of the wing root 11 of both wings 10. Any known means may be used for scanning and registering the points, and this may include targets and trackers based on laser, IR, etc., and which may be linked to a computer.

This effectively provides a cloud of points of the relevant surfaces of the wing root 11. With the cloud of points, a representation of the relevant surfaces of the wing root 11, and therefore of the volume 21 (in the sense of the 3D structure of the surfaces) of the wing root 11, can be obtained. Here, the wing root volume 21 is the region bound by the upper cover 13, lower cover 14, rear spar 15 and front spar 16 of the wing root 11 (and possibly the inboard-most rib of the wing 10 and a notional inner plane). The hole pattern 17 and the position of the hole pattern 17 relative to the wing root volume 21 is also obtained.

Furthermore, the laser tracker 85 measures the wing planform 28. This can be achieved by scanning various points 18 on the wing 10, such as the hoisting points or receptacle-sighting rods. The wing planform 28 is effectively a datum of the wing 10. The wing root volume 21 is then correlated, or timed, to the wing planform 28. This provides a timed wing root volume, which is, or contains, a mapping of the exact position and orientation of the hole pattern 17 at the wing root 11 with respect to the wing 10 as a whole.

Figure 4:
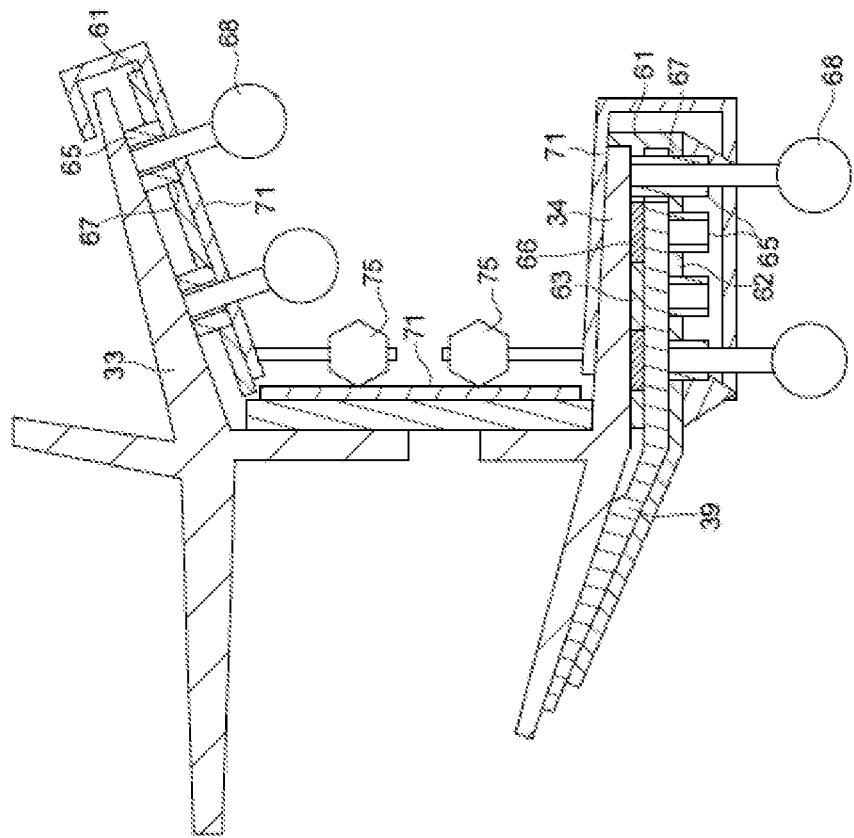
FIG. 4 shows a cross-section view of the CWB of FIG. 3 with a secondary template.

FIG. 4 shows in further detail how the mapping of the CWB 31 can be performed. The figure shows a particular cross-section view of the CWB 31. A secondary template 61 with a hole pattern 67 corresponding to that of the primary template 51, is mounted on the CWB 31, in particular on the internal surface of the cruciform 33. The secondary template 61 itself is rather similar to the primary template 51, comprising bushes 65 at the respective holes, and being preferably made of CFRP or aluminum sheets. As the surface of the CWB 31 is just a blank, the secondary template 61 is superposed onto a nominal hole pattern position, i.e., an estimate position of the hole pattern. Similar secondary templates 61 are also provided on the triform 34 (where it faces the buttstrap 39), the rear spar 35 and the front spar 36, with hole patterns 67 corresponding to those of their respective primary templates 51.

With regard to the (lower) secondary template 61 for the triform 34, it has a different configuration to that on the cruciform. It has a section 62 which lies on the buttstrap 39, linked to a section 63 which is inserted between the triform 34 and the buttstrap 39. It aims primarily to map the triform 34 external surface, which is complementary to the internal surface of the lower cover 14 of the wing root 11. To this end, the secondary template 61 may also comprise high-tolerance spacers/bushes 66 for insertion between triform 34 and the buttstrap 39 to facilitate that mapping of the triform 34. Some bushes 65 are located on the triform 34, while others are located on the buttstrap 39. Marking the position through the buttstrap 39 may allow coaxial holes that need to be provided on the triform 34 and the buttstrap 39 to be provided at the same time.

In the embodiment shown, the secondary templates 61 are mounted with the aid of supports 71, enabling them to be held against the respective surfaces. The supports 71 also comprise adjustment means 75, e.g., adjustment screws, allowing the position of the secondary templates 61 to be adjusted. However, it should be noted that the hole pattern 67 remains unchanged and corresponds to that on the primary template 51.

Once the secondary templates 61 have been mounted, targets 68 are installed on the secondary templates 61 at the bushes 65, and the laser tracker 86 begins scanning and registering the targets 68. FIG. 3 schematically shows a laser tracker 86 scanning the CWB 31. This effectively provides a cloud of points of the relevant surfaces 33-36 of the CWB 31. With the cloud of points, a representation of the relevant surfaces 33-36 of the CWB 31, and therefore of the volume 41 (in the sense of the 3D structure of the surfaces) of the CWB 31, can be obtained. The nominal hole pattern position relative to the volume 41 is also obtained. Here, the CWB volume 41 is the region bound by the cruciform 33, the triform 34, the rear spar 35 and the front spar 36 of the CWB 31 (and possibly the outboard-most rib of the CWB 31 and a notional outer plane).

Furthermore, the laser tracker 86 measures the fuselage centerline 48. This can be achieved by scanning various points 38 on the fuselage, such as the hoisting points or receptacle-sighting rods. The fuselage centerline 48 is effectively a datum of the fuselage 30. The CWB volume 41 is then correlated, or timed, to the fuselage centerline 48. This provides a timed CWB volume, which is, or contains, a mapping of the exact position and orientation of the (nominal) hole pattern at the CWB 31 with respect to the fuselage 30 as a whole.

The timed wing root volume and the timed CWB volume are then compared. This enables the position the hole pattern needs to be provided on the CWB 31 to be determined. In basic terms, this effectively compares the shapes of the wing root 11 and the CWB 31, and based on the hole pattern position, and hole pattern 17 if appropriate, of the wing root 11, identifies the position the hole pattern 17 should be duplicated on the CWB 31. It will be understood that the difference between the nominal hole pattern position and the determined hole pattern position may also be identified.

As part of this, the alignment of the wing root 11 and the CWB 31 is also determined. This may be done by taking into account the characteristics of the wing 10, such as incidence, the dihedral, the twist, the sweep. These may possibly be contained, or derived from, the wing planform 28 previously measured. In a preferred embodiment of the invention, these characteristics for both wings 10 and both sides of the CWB 31 (the CWB 31 at both sides) are taken into account to ensure dynamic symmetry.

The determined position for the hole pattern is therefore a predictive-fit in view of aircraft performance, given the actual characteristics of the wing root 11 and the CWB 31. In other words, it allows the hole pattern 17 of the wing root 11 to be duplicated on the CWB 31 at such a position that, when the wings 10 are joined to the fuselage, the aircraft will have optimum flight performance and dynamic symmetry. To this end, both wings 10 and both sides of the CWB 31 are measured, as much as possible, in the same conditions, i.e., same environment, temperature, pressure.

Ideally, the determining of the position to provide the hole pattern on the CWB 31 is done on a computer. Preferably, a dynamic measurement assembly (DMA) software is used on the computer to achieve this. The software is configured to register the scanned targets 58, 68, use the cloud of points to conduct mapping, including providing the timed volumes, for both the wing root 11 and the CWB 31. It is also configured to compare the timed volumes, and determine the position to provide of the hole pattern on the CWB 31, including determining the alignment of the wing root 11 and the CWB, taking into account the characteristics of both wings 10, in view of dynamic symmetry and optimum flight performance.

Having determined where the hole pattern is to be provided on the CWB 31, the difference with the nominal hole pattern position on the CWB 31 can be identified/removed. The laser tracker 86 can then indicate where exactly the hole pattern needs to be provided on the CWB 31. Now, the secondary template 61 on the CWB 31 is adjusted, e.g., by using the adjustment screws 75, until its hole pattern 67, being tracked by the laser, is eventually in the right position superposed with the determined hole pattern position. The adjustment is done manually, although automatic adjustment can also be envisaged.

With the hole pattern 67 on the secondary template 61 on the CWB 31 accurately superposed with the determined hole pattern position, holes can now be provided at the bushes 65 of the secondary template 61. Such holes may be provided by first drilling pilot holes through the bushes 65 with the secondary template 61 in place on the CWB 31, with final holes provided at a later stage. Alternatively, the final holes may be provided directly.

Once the hole pattern 17 has been duplicated onto the CWB 31, the wing roots 11 can be precisely positioned, in alignment with the CWB 31 and with their respective holes patterns coinciding. This is preferably done with the aid of the laser trackers 85, 86, based on the wing planform 28 and the fuselage centerline 48. If not already present, the final holes can now be drilled at the pilot holes. Bolts can subsequently be inserted in the holes, to attach the wing roots 11 to the CWB 31, and thereby join the wings 10 to the fuselage 30.

This new process allows the CWB 31 to be provided with the hole pattern 17 of the wing root 11 without requiring the wing root 11 and CWB 31 to be brought physically together. As such, it advantageously allows the holes pattern for the CWB 31 to be provided upstream in the FAL, and out of the critical path.

Furthermore, as the measurements are taken from the actual components themselves, and not just based on theoretical calculations, it will also take account of the flight characteristics of the wing 10 and CWB 31, including any defects actually inherent in them, e.g., which may be due to manufacturing, transportation. In this sense, the new process provides, through virtual representation and analysis, a predictive-fit for the actual aircraft. The assembly therefore results in an aircraft with better dynamic symmetry and optimum flight performance, primarily by reducing the degradation of performance due to the assembly process.

Note that the terms 'hole pattern' and 'template' may have at times been used in the general or collective sense, in the interest of brevity. It will be understood that the hole patterns at the respective surfaces of the wing, or CWB, can constitute a hole pattern, and likewise the templates at the various surfaces of the wing, or CWB, may be connected. It will also be appreciated that the invention may be employed to duplicate holes from just one surface of the wing root.

In the foregoing, the hole patterns 57, 67 on the primary template 51 and the secondary template 61 correspond. In most cases, they would be identical with the hole pattern 17 on the wing, having all holes represented on both templates 51, 61. However, for purposes of mapping the wing root 11 and obtaining the hole pattern position, it will be appreciated that not all holes need to be represented (but just holes at key points). The secondary template 61 for the CWB 31, which needs to have all holes of the wing root 11 pattern represented for pilot or final holes to be provided, nevertheless corresponds to the primary template 51, as it possesses at least the holes at key points in common.

Note that, in a very specific variant of the invention however, the secondary template 61 may not have all the holes represented either, but just holes at key points. Once the position for providing the hole pattern on the CWB 31 has been determined, such information may be uploaded to a robot, e.g., 6-axis robot, along with details of the hole pattern 17 on the wing root 11. The robot may then compensate automatically for the difference between the nominal hole pattern position on the CWB 31 and the determined hole pattern position, and be able to drill the necessary holes without requiring the secondary template 61 to be adjusted/remain mounted on the CWB 31.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A process of joining a wing to a fuselage of an aircraft, the process comprising the steps of:
   mapping a wing root of the wing,
   mapping a center-wing-box of the aircraft fuselage,
   determining a position to provide a hole pattern on the center-wing-box,
   providing the hole pattern on the center-wing-box, and attaching the wing root to the center-wing-box,
   wherein the step of mapping of the wing root includes obtaining a cloud of points and thereby measuring a volume of the wing root,
   wherein the step of mapping the wing root further includes the step of measuring a wing planform, and
   wherein the step of mapping the wing root comprises timing the wing root volume to the wing planform.

2. A process of joining a wing to a fuselage of an aircraft, the process comprising the steps of:
   mapping a wing root of the wing,
   mapping a center-wing-box of the aircraft fuselage,
   determining a position to provide a hole pattern on the center-wing-box,
   providing the hole pattern on the center-wing-box, and attaching the wing root to the center-wing-box, wherein the step of mapping of the wing root includes obtaining a cloud of points and thereby measuring a volume of the wing root, wherein the step of mapping of the center-wing-box includes obtaining a cloud of points and thereby measuring a volume of the center-wing-box, and wherein the obtaining a cloud of points involves the steps of:

mounting a secondary template with a hole pattern corresponding to the hole pattern of the primary template, on the center-wing-box, superposing the secondary template onto a nominal hole pattern position on the center-wing-box, installing targets on the secondary template, and scanning the targets.

3. The process according to claim 2, wherein the step of mapping the center-wing-box further includes the step of:

measuring the fuselage centerline.

4. The process according to claim 3, wherein the step of mapping the center-wing-box comprises timing the center-wing-box volume to the fuselage centerline.

5. A process of joining a wing to a fuselage of an aircraft, the process comprising the steps of:

mapping a wing root of the wing, mapping a center-wing-box of the aircraft fuselage, determining a position to provide a hole pattern on the center-wing-box, providing the hole pattern on the center-wing-box, and attaching the wing root to the center-wing-box wherein the step of mapping of the wing root includes obtaining a cloud of points and thereby measuring a volume of the wing root, wherein the obtaining a cloud of points involves the steps of:

mounting a primary template with a hole pattern on the wing root, superposing the hole pattern of the primary template onto a hole pattern on the wing root, installing targets on the primary template, scanning the targets, wherein the step of mapping the wing root further includes the step of:

measuring a wing planform, wherein the step of mapping the wing root comprises timing the wing root volume to the wing planform, wherein the step of mapping of the center-wing-box includes obtaining a cloud of points and thereby measuring a volume of the center-wing-box, wherein the obtaining a cloud of points involves the steps of:

mounting a secondary template with a hole pattern corresponding to the hole pattern of the primary template, on the center-wing-box, superposing the secondary template onto a nominal hole pattern position on the center-wing-box, installing targets on the secondary template, scanning the targets, wherein the step of mapping the center-wing-box further includes the step of:

measuring the fuselage centerline, wherein the step of mapping the center-wing-box comprises timing the center-wing-box volume to the fuselage centerline, wherein determining the position to provide the hole pattern on the center-wing-box comprises the steps of:

comparing the timed wing root volume and the timed center-wing-box volume, determining an alignment of the wing root and center-wing-box.

6. The process according to claim 5, wherein the step of determining the alignment of the wing root and the center-wing-box includes:

taking account of characteristics of the wing, comprising at least one of an incidence, a dihedral, a twist and a sweep.

7. The process according to claim 6, wherein the step of determining the alignment further includes:

taking account of the characteristics of both wings and both sides of the center-wing-box, in view of dynamic symmetry and optimum flight performance of the aircraft.

8. The process according to claim 6, wherein the step of providing the hole pattern on the center-wing-box further includes adjusting the position of the secondary template on the center-wing-box such that its hole pattern is superposed onto the determined hole pattern position.

9. The process according to claim 6, wherein the step of providing the hole pattern on the center-wing-box further includes using a robot to compensate for a difference between the nominal hole pattern position and the determined hole pattern position.

* * * * *